United States Patent
Cao et al.

(10) Patent No.: US 11,436,594 B2
(45) Date of Patent: Sep. 6, 2022

(54) APPARATUS AND METHOD FOR REVERSE AUTHORIZATION

(71) Applicant: Samsung Electronics Co. Ltd., Suwon-si (KR)

(72) Inventors: Xu Cao, San Jose, CA (US); Aamer Khani, San Jose, CA (US); Ruifeng Xu, San Jose, CA (US); Benny Wong, San Francisco, CA (US); Shigong Liu, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 917 days.

(21) Appl. No.: 13/758,303

(22) Filed: Feb. 4, 2013

(65) Prior Publication Data
US 2014/0222687 A1  Aug. 7, 2014

(51) Int. Cl.
*G06Q 20/38* (2012.01)
*G06Q 20/02* (2012.01)
*G06Q 20/40* (2012.01)

(52) U.S. Cl.
CPC ......... *G06Q 20/3821* (2013.01); *G06Q 20/02* (2013.01); *G06Q 20/4014* (2013.01)

(58) Field of Classification Search
CPC ........ G06Q 20/38; G06Q 20/02; G06Q 20/32; G06Q 20/3841; G06Q 20/4014; G06Q 20/3821
USPC .......................................................... 705/71
See application file for complete search history.

(56) References Cited

U.S. PATENT DOCUMENTS

| | | | |
|---|---|---|---|
| 2008/0235132 A1* | 9/2008 | Banatre | G06Q 20/10 705/39 |
| 2009/0254749 A1* | 10/2009 | Li | G06F 21/34 713/169 |
| 2011/0270751 A1* | 11/2011 | Csinger | G06Q 21/40 705/42 |
| 2012/0039326 A1* | 2/2012 | Chia | H04L 63/04 370/342 |
| 2013/0160138 A1* | 6/2013 | Schultz | G06F 21/6254 726/27 |

FOREIGN PATENT DOCUMENTS

KR  10-2011-0071201 A  6/2011

OTHER PUBLICATIONS

Office Action dated Mar. 16, 2020 in connection with Korean Patent Application No. 10-2014-0012729, 15 pages.
Notice of Patent Grant dated Jun. 17, 2020 in connection with Korean Patent Application No. 10-2014-0012729, 4 pages.

* cited by examiner

*Primary Examiner* — Edward Chang

(57) ABSTRACT

An apparatus and method for user identity control are provided. The apparatus includes a communication unit, a storage unit including a unique ID and a plurality of sections, each section including different identity information, and a controller for, in response to a transaction request, transmitting a request for identity information to an authorization server via the communication unit, and for, in response to authorization information received from the authorization server, transmitting identity information to a third party to complete the transaction according to the received authorization information.

12 Claims, 4 Drawing Sheets

| COMPANY 1 | ACCESS INFORMATION |
|---|---|
| COMPANY 2 | ACCESS INFORMATION |
| ⋮ | ⋮ |
| COMPANY X | ACCESS INFORMATION |

FIG. 5

APPARATUS AND METHOD FOR REVERSE AUTHORIZATION

BACKGROUND OF THE INVENTION

1. Field of the Invention

The present invention relates to an apparatus and method for reverse authorization. More particularly, the present invention relates to an apparatus and method for reverse authorization using Near Field Communication (NFC).

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Mobile devices are also being used as a form of identity and as a mechanism for completing transactions. For example, instead of paying for a meal with a credit card, a restaurant patron may present a mobile device. Payment for the meal may be performed using the mobile device, such as by scanning a barcode displayed on the mobile device. Similarly, identification information on the mobile device may be accessed when completing a transaction with a third party.

However, while techniques for associating the identity of a user with a corresponding mobile device (or devices) are currently under development, these techniques of the related art are concerned mostly with pairing the identity of a user with a mobile device in a reliable manner. These techniques are not concerned with how this identity information is used by third party requesters. A third party may be able to obtain much more information about the user than may be necessary to complete a given transaction. Users are now becoming more protective of their personally identifying information, and desire a mechanism for limiting the access of third parties to this identity information. Accordingly, there is a need for providing a method and apparatus to allow a user control over identity information in a mobile device or other identity device.

SUMMARY OF THE INVENTION

Aspects of the present invention are to address at least the above-mentioned problems and/or disadvantages and to provide at least the advantages described below. Accordingly, an aspect of the present invention is to provide an apparatus and method for reverse authorization.

In accordance with an aspect of the present invention, an apparatus for user identity control is provided. The apparatus includes a communication unit, a storage unit including a unique ID and a plurality of sections, each section including different identity information, and a controller for, in response to a transaction request, transmitting a request for identity information to an authorization server via the communication unit, and for, in response to authorization information received from the authorization server, transmitting identity information to a third party to complete the transaction according to the received authorization information.

In accordance with another aspect of the present invention, a method for authorizing release of identity information in a transaction with a third party by an identity device is provided. The method includes receiving a transaction request, transmitting, to an authorization server, a request for authorization to transmit identity information to the third party, receiving authorization information from the authorization server in response to the transaction information, and when the authorization information indicates at least one category of identification information, transmitting corresponding identity information stored in the identity device to the third party.

In accordance with another aspect of the present invention, a method for authorizing release of identity information in a transaction with a third party by an authorization server is provided. The method includes receiving transaction information from an identity device, determining whether a third party is authorized to receive identity information, and transmitting authorization information to the identity device according to the result of the determination.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 5 is a diagram of a white list according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for reverse authorization.

Figure 1:
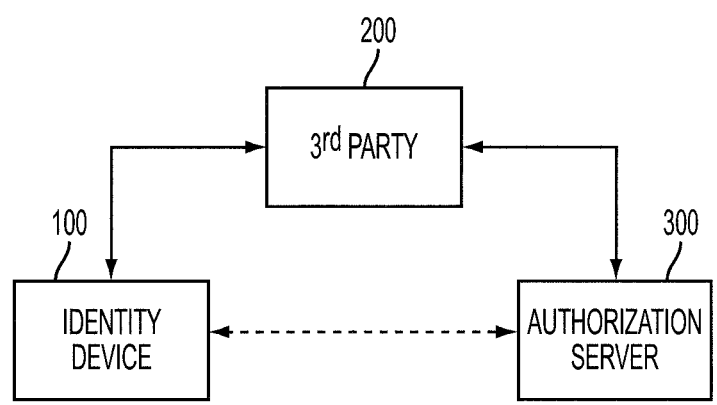
FIG. 1 is a diagram of a reverse authorization system according to an exemplary embodiment of the present invention.

FIG. 1 is a diagram of a reverse authorization system according to an exemplary embodiment of the present invention.

Referring to FIG. 1, the reverse authorization system includes an identity device 100, a $3^{rd}$ party 200, and an authorization server 300. The identity device 100, $3^{rd}$ party 200, and authorization server 300 may communicate with each other over the same network or over different networks. For example, the identity device 100 may communicate with the $3^{rd}$ party 200 via a Personal Area Network (PAN), such as Near Field Communication (NFC) or Bluetooth, while the authorization server 300 may communicate with the $3^{rd}$ party 200 and/or the identity device 100 via a Wide Area Network (WAN) such as Internet or a cellular telephone network.

The identity device 100 communicates identity information to the authorization server 300, either directly (as shown by the dotted lines) or through the $3^{rd}$ party 200. The authorization server 300 authorizes the $3^{rd}$ party 200 to use a certain category of identity information stored in the identity device 100. When the identity device 100 receives the authorization from the authorization server 300, the identity device 100 releases the authorized category of information to the $3^{rd}$ party 200, enabling the user and the $3^{rd}$ party 200 to complete a transaction. This process is described below in more detail with respect to FIG. 2.

According to an exemplary embodiment of the present invention, the identity device 100 may be a user's mobile device, such as a cellular phone, smartphone, tablet, Personal Digital Assistant (PDA), and the like. However, the identity device 100 may also be in the form of an identity card, in which the identity information and a communication mechanism are stored. The identity card may communicate with the $3^{rd}$ party 200 and the authorization server 300 via Near Field Communication (NFC) or via a Radio Frequency ID (RFID) tag installed in the identity card. If the identity device 100 is a mobile device, then the mobile device may also communicate via other communication technologies in addition to NFC or RFID, such as Bluetooth, Wi-Fi, cellular, and the like.

The $3^{rd}$ party 200 performs the transaction with the user of the identity device 100. The transaction may be, for example, a sale of goods or services. However, the transaction need not be limited to sales; the transaction may be any sort of transaction for which the user's identity or information about the user may be needed. The $3^{rd}$ party 200 may be a web site or other online service, or may have a physical presence, such as a restaurant or brick-and-mortar store.

The authorization server 300 may be a public server that authorizes third parties (such as the $3^{rd}$ party 200) to receive particular categories of identity information, according to a white list defined by the user. To provide greater security, the authorization server 300 may be independent of the third parties.

The authorization server 300 provides an interface to allow a user to register an identity device with the authorization server 300 and thereby create a white list associated with each registered identity device. The authorization server 300 also provides an interface to modify the stored white lists. Each white list includes categories of identity information that corresponding $3^{rd}$ parties are authorized to access. These categories may include information used for specific purposes, such as bank account information (e.g., account number), government-related information (Social Security number), financial information (e.g., mortgage amount, interest rate, etc.), and the like. The categories may also include other types of personal information, such as address information, age, etc. If the category of information that the $3^{rd}$ party 200 is requesting matches a corresponding category in the white list, the authorization server 300 authorizes the transaction, and transmits the authorization information to the identity device 100 to authorize the identity device 100 to release the identity information and complete the transaction. White lists are described below in more detail with respect to FIG. 5, and a process of authorizing the $3^{rd}$ party 200 to receive identity information is described below with respect to FIG. 2.

Figure 2:
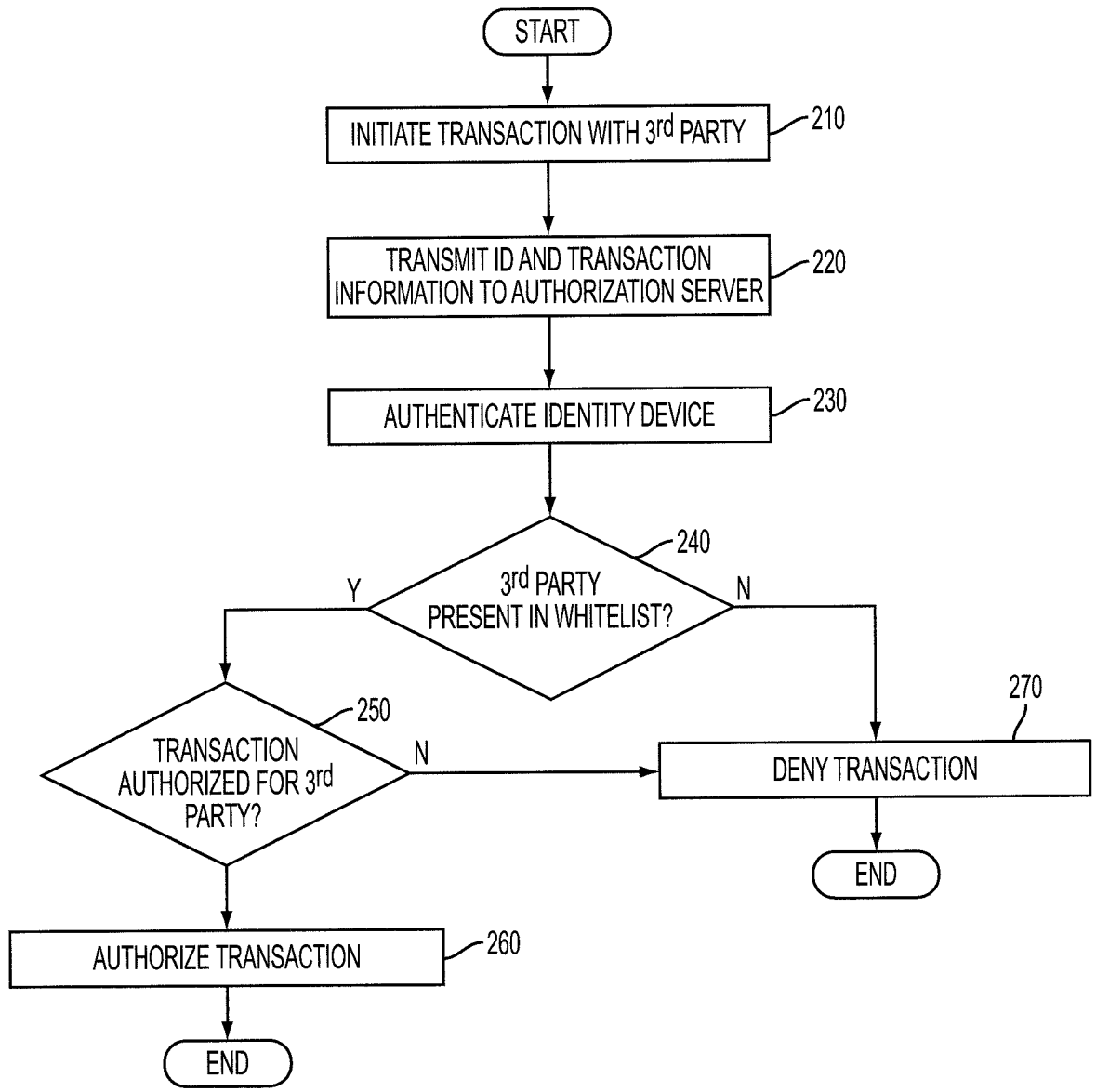
FIG. 2 is a flowchart of a method for reverse authorization according to an exemplary embodiment of the present invention.

FIG. 2 is a flowchart of a method for reverse authorization according to an exemplary embodiment of the present invention.

Referring to FIG. 2, the user initiates a transaction with the $3^{rd}$ party 200 in step 210. In an online context, this may occur when the user begins a checkout process, but may occur at another point, such as when the user first visits the $3^{rd}$ party site, or at another point. Similarly, for a physical presence, the transaction may occur at the point of sale. However, the initiation of the transaction may occur at any time during the interaction with the user and the $3^{rd}$ party 200. For example, the initiation of the transaction at step 210 may occur when the $3^{rd}$ party 200 requests identity information from the user.

In step 220, the identity device 100 transmits identity information to the authorization server 300. The identity request may include, for example, a secure ID stored in the identity device 100, a user password supplied by the user, and other information. The request may also include transaction information about the transaction, such as a type of the transaction and the identity of the $3^{rd}$ party 200. Some of this information may be supplied by the identity device 100 or by the $3^{rd}$ party 200. As shown in FIG. 1, all or some of the information may be transmitted from the identity device 100 to the authorization server 300 directly, or transmitted via the $3^{rd}$ party 200. The transaction information may be supplied by the $3^{rd}$ party 200. In this case, the request may be transmitted from the identity device 100 to the $3^{rd}$ party 200, and the $3^{rd}$ party 200 may incorporate the transaction information into request and forward the request to the authorization server 300. For example, if the user is purchasing a bottle of wine, the information may include an indication that the purchase is an alcoholic beverage purchase.

In step 230, the authorization server 300 authenticates the identity device 100 according to the received information, such as the secure ID and/or the password. When the identity device 100 is verified, the authorization server 300 looks up the 3$^{rd}$ party 200 in the white list corresponding to the identity device 100 and determines whether the 3$^{rd}$ party 200 is present in the white list in step 240.

If the 3$^{rd}$ party 200 is not present in the white list, the authorization server 300 denies the transaction in step 270. The authorization server 300 may transmit the denial to one or both of the identity device 100 and the 3$^{rd}$ party 200. In addition, the authorization server 300 may also transmit information about a reason for the denial, such as '3$^{rd}$ party not present in white list'. This may provide the user with an opportunity to add the 3$^{rd}$ party 200 to the white list, and thereby attempt the transaction again.

If the 3$^{rd}$ party 200 is present in the white list, the authorization server 300 analyzes the white list to determine whether the transaction with the 3$^{rd}$ party 200 may be authorized in step 250. The determination as to whether the 3$^{rd}$ party 200 is authorized may depend upon the type of the transaction. For example, in the case of the wine purchase, the white list information may indicate that the 3$^{rd}$ party 200 is not authorized for purchasing wine.

If the 3$^{rd}$ party 200 is not authorized for the transaction, the authorization server 300 denies the transaction in step 270, as described above. If the authorization server 300 transmits information about the reason for the denial, the authorization server 300 may, in this case, transmit information indicating that the 3$^{rd}$ party 200 is not authorized for the particular transaction. In the case of the wine purchase, for example, if the 3$^{rd}$ party 200 is not authorized for alcohol purchase, the authorization server 300 may transmit information such as '3$^{rd}$ any is not authorized for alcohol purchases'. As above, the user may then update the white list to allow the purchase of alcohol from the 3$^{rd}$ party 200 and then attempt the transaction again.

If the 3$^{rd}$ party 200 is authorized for the transaction, the authorization server 300 allows the transaction in step 260 and transmits information to the identity device 100 to enable the identity device 100 to release identity information to the 3$^{rd}$ party 200 and thereby complete the transaction. For example, the authorization server 300 may transmit a decryption key for corresponding information stored in the identity device 100 that includes the authorized identity information. In the case of the wine purchase, the authorized identity information may include credit card information as well as age information to confirm that the user is of legal age to purchase alcohol.

While the transaction may be authorized from the point of view of the authorization server 300 (i.e., the authorization server 300 concludes that the 3$^{rd}$ party 200 is authorized to access certain categories of identity information), the transaction may still fail if the authorized identity information is insufficient to allow the 3$^{rd}$ party 200 to approve the transaction. For example, the authorization server 300 may determine that the 3$^{rd}$ party 200 is authorized to receive credit card information, but the 3$^{rd}$ party 200 also requested address information that the 3$^{rd}$ party 200 is not authorized to receive. In this case, the user may update the white list and attempt the transaction again (e.g., update the white list to allow the 3$^{rd}$ party 200 to receive address information).

Multiple requests for identity information may be made during the same interaction between the user and the 3$^{rd}$ party 200. For example, when the 3$^{rd}$ party 200 is a plumber, the plumber may first request address information, and then at a later point request credit card information (when the job is complete).

As described above, the white list allows the user greater control over the user's identity information. For example, the user may allow certain third parties to receive credit card information to process a transaction, but not address or telephone information. Other third parties, such as on-line retailers or service providers (plumbers, electricians, contractors, and the like), may be authorized to receive address information (for example, to make a delivery or appointment).

Figure 3:
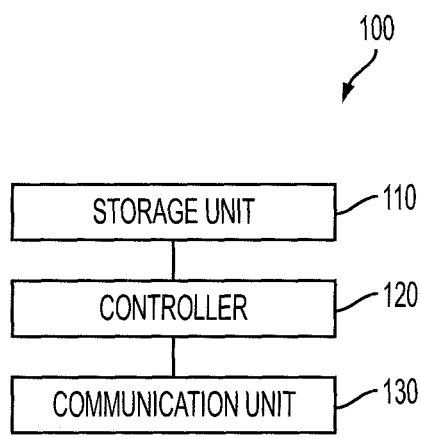
FIG. 3 is a diagram of a mobile device according to exemplary embodiments of the present invention.

FIG. 3 is a diagram of an identity device according to exemplary embodiments of the present invention.

Referring to FIG. 3, the identity device 100 includes a storage unit 110, a controller 120, and a communication unit 130. As described above with respect to FIG. 1, when the identity device 100 is an identity card, the functionality of the controller 120 and the communication unit 130 may be integrated into a single component.

The identity device 100 may also include additional components not shown. These additional components may vary according to additional functions of the mobile device. For example, the mobile device 100 may include a display unit, an input unit, a camera, a location unit, and the like.

The controller 120 controls overall operations of the mobile device 100. In particular, the controller 120 controls the communication unit 130 to transmit identity information to the authorization server 300 for authorization. Upon receipt of authorization to release the identity information to a third party, the controller 120 retrieves the appropriate identity information from the storage unit 110 and controls the communication unit 130 to transmit the identity information to the third party to complete (or initiate) a transaction. If the identity information is encrypted, the controller 120 may decrypt the identity information using a decryption key stored on the mobile device or received from the authorization server 300.

The communication unit 130 communicates with other devices, including, for example, the 3$^{rd}$ party 200 and the authorization server 300, under the control of the controller 120. The communication unit 130 may communicate with the other devices (including the 3$^{rd}$ party 200 and the authorization server 300) according to any of a variety of protocols and methods. For example, the communication unit 130 may communicate via NFC or other short-range communication method. However, the communication unit 130 is not limited to these protocols, and may use other protocols according to the design of the mobile device.

The storage unit 110 stores identity information. The identity information may include a unique ID as well as various categories of identity information that may be shared to third parties according to a white list defined by the user. An example of the storage unit 110 is described below with respect to FIG. 4.

Figure 4:
FIG. 4 is a diagram of a storage unit usable in an identity device according to an exemplary embodiment of the present invention.

FIG. 4 is a diagram of a storage unit usable in an identity device according to an exemplary embodiment of the present invention.

Referring to FIG. 4, the storage unit 110 includes a unique ID and sections 1 to sections N. The unique ID may be stored in the first M bytes of the storage unit 110; however, it is understood that the unique ID may be stored in other locations of the storage unit 110 as well. The unique ID may be a signed unique ID.

Each of the sections 1 to N includes a different category of identity information. The categories may include individual identity information, such as address information, telephone information, E-mail addresses, personal information (e.g., age, height, gender, and the like), and other types of information. The categories may also include collections of identity information, such as information related to bank accounts (such as credit card numbers, account numbers, bank routing numbers), government information (such as Social Security numbers, Taxpayer Identification Numbers), personal information (such as name, age, weight), and other collections of related identity information. The categories may be defined by the user or may be pre-set by a developer or manufacturer.

The individual sections 1 to N may also be encrypted for additional security. In this case, each section may have an associated public key or other decryption key. The decryption keys may be stored in an unencrypted portion of the corresponding section, or may be stored in another area of the storage unit (not shown). Alternatively, the decryption keys may be held by the authorization server 300 and transmitted to the mobile device upon authorization of the transaction.

The user controls access to the identity information stored in the storage unit 110 via the white list stored by the authorization server 300. An example of the white list is described below with respect to FIG. 5.

FIG. 5 is a diagram of a white list according to an exemplary embodiment of the present invention.

Referring to FIG. 5, the white list includes a list of companies (in this example, company 1 to company X) and corresponding access rights. Although the white list is described in the example of FIG. 5 with respect to companies, it is to be understood that the white list may include access rights for any third party which the user may wish to provide identity information. The authorization server 300 may store a plurality of white lists, one for each identity device 100 registered with the authorization server 300. The authorization server 300 may store the white lists in any of a variety of formats.

Each access right may include a list of categories of identity information that the corresponding company is authorized to receive. In addition to the identity information, the access right may also include a transaction type. The transaction type may indicate that a particular purchase is or is not permitted. For example, referring back to the example of the wine purchase described above with respect to FIG. 2, the access right may specify that a particular third party is not authorized for wine purchases. These transaction types (as well as the other categories) may be defined by the user. Manufacturers and/or developers may also provide default or pre-defined transaction types.

The particular access rights associated with a company may vary according to the user's definition. For example, a restaurant may only be entitled to access identity information related to the user's age (to confirm that the user is old enough to purchase alcohol) and the user's credit card information (to process payment for a meal). A plumber may be entitled to receive information about the user's credit card information (to process payment) as well as address information (so that the plumber may find the user's home) and telephone information (to contact the user). An online store may be entitled to the user's credit card information and address information (to ensure proper delivery). Accordingly, the information associated with a particular company may vary according to how much information the user is willing to provide. Similarly, a given $3^{rd}$ party may be allowed to receive certain categories of information based on a particular transaction type.

In addition, the access right may also include information about a decryption key for the corresponding sections of the storage unit containing the identity information that the company is permitted to access. This information may include the decryption key itself. If the decryption key is stored elsewhere, the white list may include a pointer or other reference to the location of the decryption key.

As described above with respect to FIG. 2, the authorization server 300 consults the white list to determine which identity information (if any), a third party is authorized to receive. The authorization server 300 transmits an authorization according to the information contained in the white list.

The particular companies and corresponding access rights stored in the white list may be defined by the user. The authorization server 300 may provide an interface to allow the user to add third parties to the white list, delete third parties from the white list, or change access rights associated with particular third parties. This interface may require the identity device 100 (e.g., authorization for the user to edit the white list may need information contained in the identity device 100, such as the unique ID), or the interface may have a separate authentication procedure.

The authorization server 300 may also provide an interface for the user to register an identity device 100 with the authorization server 300. Once registered, the authorization server 300 may also provide an interface to allow the user to modify or change the white list. Such modification may include adding or deleting $3^{rd}$ parties included in the list, as well as changing the categories of identity information that a $3^{rd}$ party is permitted to receive.

As described above according to exemplary embodiments of the present invention, a user of an identity device is allowed greater control over what and how the user's identity information is released to third parties, thereby improving security and limiting the release of unwanted identity information.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for user identity control in an electronic transaction system with a mobile terminal, the apparatus comprising:

a communication unit configured to communicate, via a first wireless communication medium, with an authorization server and, via a second wireless communication medium, with a mobile device of a third party;

a storage unit configured to store a unique ID and a plurality of sections, each of the plurality of sections including a different category of identity information of a user of the apparatus; and a controller configured to:

in response to a transaction request received, via the second wireless communication medium, from the mobile device of the third party, control the communication unit to transmit transaction information to the authorization server, when the authorization server verifies that the third party is included in a list of third parties preapproved for transacting with the apparatus, control the communication unit to receive, from the authorization server via the first wireless communication medium, authorization information for releasing at least one category of the identity information stored in the storage unit, based on a type of a transaction, and a decryption key corresponding to the at least one category of the identity information, and in response to receiving the authorization information for releasing the at least one category of the identity information from the authorization server and the decryption key corresponding to the at least one category of the identity information, decrypt encrypted identity information corresponding to the at least one category of the identity information using the decryption key, and control the communication unit to transmit, via the second wireless communication medium, the decrypted identity information to the mobile device of the third party to complete the transaction according to the received authorization information.

2. The apparatus of claim 1, wherein the communication unit is configured to communicate via Near Field Communication (NFC).

3. The apparatus of claim 1, wherein the communication unit is configured to transmit the unique ID to the authorization server via the mobile device of the third party.

4. The apparatus of claim 1,
wherein each of the plurality of sections is encrypted.

5. The apparatus of claim 1, wherein the transaction information includes the unique ID.

6. The apparatus of claim 1, wherein the transaction information includes at least one of: information identifying the third party and the type of the transaction.

7. The apparatus of claim 1, wherein:
the storage unit includes an identity storage including the unique ID and the plurality of sections, and
the unique ID is located at a front of the identity storage, followed by the plurality of sections.

8. The apparatus of claim 1, wherein each of the sections includes one of: (i) individual identify information and (ii) a collection of related identity information.

9. A method for authorizing release of identity information stored in an identity device in an electronic transaction with a mobile device of a third party by the identity device, the method comprising:
communicating, by the identity device via a first wireless communication medium, with an authorization server and, via a second wireless communication medium, with the mobile device of the third party;
receiving, by the identity device via the second wireless communication medium, transaction information related to a transaction requested by the mobile device of the third party;
transmitting, by the identity device via the first wireless communication medium to the authorization server, a request for authorization information, based on a type of the transaction, for at least one category of the identity information stored in the identity device;
when the authorization server determines that the third party is included in a list of third parties preapproved for transacting with the identity device, receiving, by the identity device via the first wireless communication medium, the authorization information and a decryption key corresponding to the at least one category of the identity information from the authorization server; and
when the authorization information indicates an existence of the at least one category of the identity information stored in the identity device, decrypting, by the identity device, encrypted identity information corresponding to the at least one category of the identity information using the decryption key, and transmitting, by the identity device via the second wireless communication medium, the decrypted identity information to the mobile device of the third party to complete the transaction according to the received authorization information.

10. The method of claim 9, wherein the request for authorization information includes a unique ID of the identity device.

11. The method of claim 9, wherein the request for authorization information includes at least one of: information identifying the third party and the type of the transaction.

12. The method of claim 9, wherein the identity device stores a plurality of categories of identity information, and
wherein each of the categories of the identity information includes one of: (i) individual identity information (ii) and a collection of related identity information.

* * * * *